United States Patent [19]

Clegg

[11] Patent Number: 4,603,593
[45] Date of Patent: Aug. 5, 1986

[54] SYNCHRONIZED SCOTCH YOKE

[76] Inventor: John E. Clegg, 2320 Keystone Dr., Orlando, Fla. 32806

[21] Appl. No.: 702,712

[22] Filed: Feb. 19, 1985

[51] Int. Cl.⁴ .................... F16H 21/18; F16H 21/22
[52] U.S. Cl. .......................................... 74/50; 74/44; 74/55
[58] Field of Search .................... 74/49, 50, 55, 44

[56] References Cited

U.S. PATENT DOCUMENTS

| | | | |
|---|---|---|---|
| 41,373 | 1/1864 | Glass | 74/50 |
| 1,051,917 | 2/1913 | Root | 74/55 |
| 1,385,002 | 7/1921 | Hall | 74/55 |
| 1,748,443 | 2/1930 | Dawson | 74/55 |
| 1,979,195 | 10/1934 | Govare et al. | 74/55 |
| 4,485,768 | 12/1984 | Heniges | 123/48 B |

FOREIGN PATENT DOCUMENTS 540986  11/1941  United Kingdom .................... 74/50

OTHER PUBLICATIONS

Pictorial Handbook of Technical Devices, P. Grafstein et al., Chemical Publishing Co. Inc., 1971, pp. 146–147.

Primary Examiner—Lawrence Staab

[57] ABSTRACT

A mechanical device for converting crank motion to reciprocating motion. The yoke with the perpendicular slot engaging the crank pin in the flywheel of the conventional scotch yoke is replaced by two metal blocks with curved cam tracks which produce a uniform stroke.

1 Claim, 5 Drawing Figures

SYNCHRONIZED SCOTCH YOKE

BACKGROUND

Prior art in scotch yoke devices is limited to devices in which the slot or raceway of the yoke is perpendicular to the reciprocating member. A perpendicular slot produces an erratic stroke of the reciprocating member. Maximum power and minimum velocity of the reciprocating member occurs at the beginning and end of the stroke, and minimum power and maximum velocity occurs at midstroke.

J. W. Hall's *Mechanism For Converting Rotary To Reciprocating Movement*, U.S. Pat. No. 1,385,002, 7/19/21, features a cam pin mounted between two revolving disks and alternately engaging cam tracks in the disks.

SUMMARY

The yoke of the synchronized scotch yoke has curved cam tracks resembling in shape a reclining figure eight or the mathematical symbol for infinity. Each degree of revolution of the crank pin produces uniform displacement of the reciprocating member, and power is distributed evenly throughout the stroke.

Clegg's synchronized scotch yoke differs from Hall's mechanism in two significant ways. First, Clegg's cam tracks are located in two opposed reciprocating cam blocks (yokes), not in revolving disks as in Hall's mechanism. Second, Clegg's cam tracks form a reclining figure eight which is altogether different from Hall's multiple circular disks.

DRAWINGS

DESCRIPTION

Figure 1:
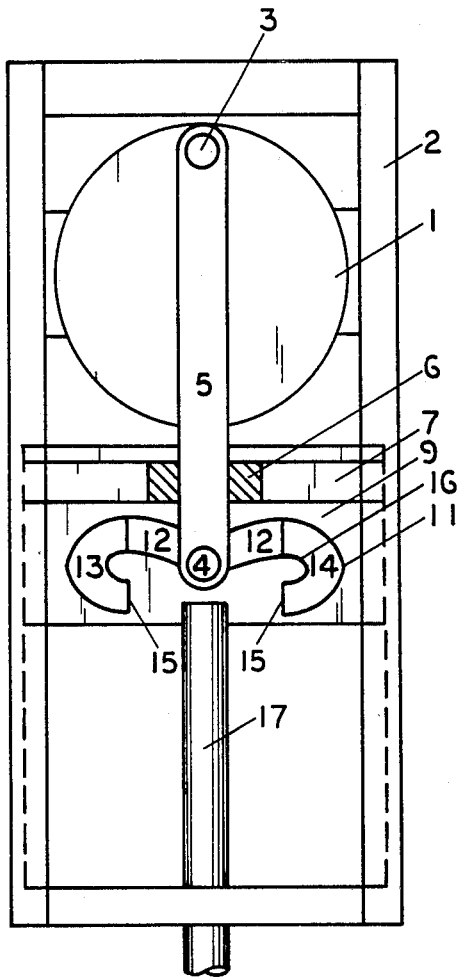
FIG. 1 is an elevation of the synchronized scotch yoke.
Figure 2:
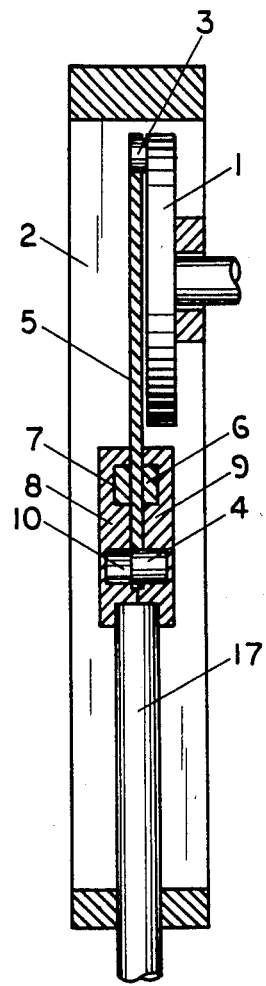
FIG. 2 is a cross section of the synchronized scotch yoke.
Figure 3:
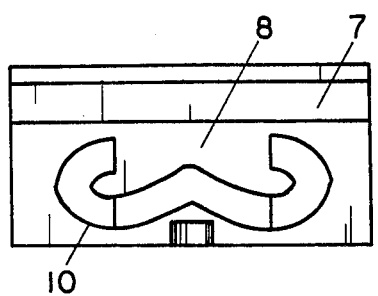
FIG. 3 is a plan view of the front cam block.

FIGS. 1 and 2 show the synchronized scotch yoke with flywheel 1 mounted in frame 2. The rotary motion of crankpin 3 is converted into reciprocating motion of cam pin 4 by connecting rod 5. Vertical alignment of rod 5 is maintained by horizontal traveler block 6 which reciprocates in transverse slot 7 in front cam block 8 and rear cam block 9.

The bottoms of front cam track 10 and rear cam track 11 are divided into three sections; flat section 12 in the center of the track and ramps 13 and 14 rising from flat scetion 12 to the terminating line 15 where cam pin 4 is forced out of one cam track into the other.

Clockwise revolution of flywheel 1 moves cam pin 4 to the right in rear cam track 11. Cam pin 4 rides against inner wall 16 and forces push rod 17 down. Cam pin 4 is forced out of rear cam track 11 as it moves around the loop of the track, and it is pressed into front cam track 10 as it crosses terminating line 15. The downward stroke of push rod 17 ends when cam pin 4 reaches the center of front cam track 10.

Figure 4:
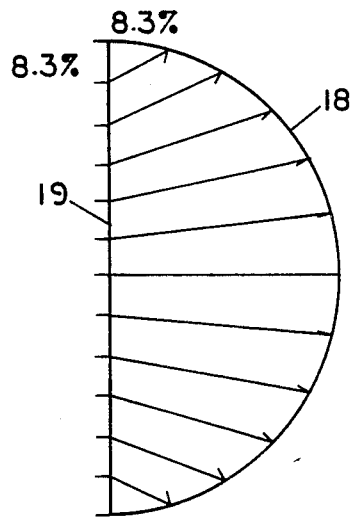
FIG. 4 is a graphic representation of the uniform stroke produced by the synchronized scotch yoke.

FIG. 4 is a graphic representation of the rotary motion of flywheel 1 and the downward stroke of push rod 17. The semicircular line 18 represents 180° revolution of flywheel 1 divided into twelve 15° sections, each being 8.3% revolution. The straight vertical line 19 represents the downward stroke of push rod 17 divided into twelve sections, each being 8.3% of the stroke. It can be seen that rotary and rectilinear motions are synchronized.

Figure 5:
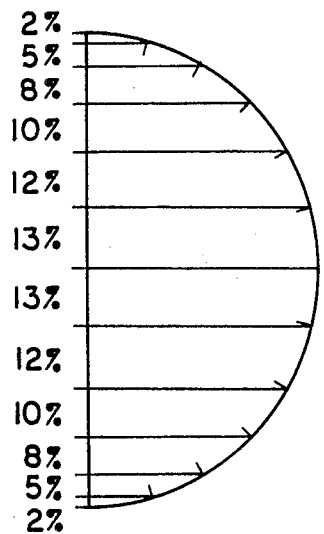
FIG. 5 is a graphic representation of the erratic stroke of the conventional scotch yoke with a perpendicular slot.

FIG. 5 shows the erratic stroke of the push rod in the conventional scotch yoke with a perpendicular slot in the yoke. For the first 8.3% revolution of the flywheel, the rod is displaced only 2% of the downward stroke. The delayed 6.3% part of the stroke does not occur until the push rod is approaching midstroke. This shows that maximum power and minimum velocity of the push rod occurs at the beginning and end of the stroke, and that minimum power and maximum velocity of the push rod occurs at midstroke. This puts a strain on the motor, causes undue vibration and has a negative effect on the work being performed.

I claim:

1. A synchronized scotch yoke comprising in general two opposed front and rear cam blocks having two opposed curved recessed cam tracks which engage opposite ends of a reciprocating cam pin and convert the irregular reciprocating linear motion of the cam pin to uniform reciprocating linear motion of the cam blocks, and comprising in particular;

a flywheel (1) mounted in a vertical plane on a shaft occupying a horizontal axis, a crank pin (3) mounted in the peripheral area of a face of said flywheel, a connecting rod (5) occupying a vertical axis adjacent to said face of said flywheel, said connecting rod having an upper end, a lower end, and a medial section, said upper end engaging said crank pin, a cam pin (4) occupying a horizontal axis, said cam pin having a front end, a rear end, and a center, said center engaging said lower end of said connecting rod, a front cam block (8) having a transverse slot (7) in an upper inside face thereof and having a curved recessed front cam track (10) in a lower inside face thereof, a rear cam block (9) having a transverse slot (7) in an upper inside face thereof and having a curved recessed rear cam track (11) in the lower inside face thereof, a horizontal traveler block (6) mounted in said transverse slots, said traveler block having a hole slidably engaging said medial section of said connecting rod, said front cam track having a flat central section (12), a curved inclined ramp (13) to the left of said central section and a curved inclined ramp (14) to the right of said central section, said rear cam track having a flat central section (12), a curved inclined ramp (13) to the left of said central section and a curved inclined ramp (14) to the right of said central section, said curved inclined ramp (13, 14) having terminating lines (15) comprising the extremities of said curved inclined ramps, said front cam block and said rear cam block being mounted with said inside faces in contact so that said front cam track and said rear cam track form an enclosed cam track, said cam pin being mounted inside said enclosed cam track, with said front end of said cam pin traveling in said front cam track and said rear end of said cam pin travelling in said rear cam track.

* * * * *